United States Patent
Berland et al.

(10) Patent No.: US 9,472,814 B1
(45) Date of Patent: Oct. 18, 2016

(54) BENDABLE SCORING LINES IN THIN-FILM SOLID STATE BATTERIES

(71) Applicant: ITN Energy Systems, Inc., Littleton, CO (US)

(72) Inventors: Brian Spencer Berland, Morrison, CO (US); Michael Wayne Stowell, Loveland, CO (US); Jonathan Michael Banks, Lakewood, CO (US); Calvin Roger Sprangers, Englewood, CO (US); Andrew Colclasure, Littleton, CO (US)

(73) Assignee: ITN ENERGY SYSTEMS, INC., Littleton, CO (US)

( * ) Notice: Subject to any disclaimer, the term of this patent is extended or adjusted under 35 U.S.C. 154(b) by 96 days.

(21) Appl. No.: 14/446,129

(22) Filed: Jul. 29, 2014

Related U.S. Application Data

(60) Provisional application No. 61/859,633, filed on Jul. 29, 2013, provisional application No. 61/974,932, filed on Apr. 3, 2014.

(51) Int. Cl.

| | |
|---|---|
| *H01M 10/04* | (2006.01) |
| *B32B 38/04* | (2006.01) |
| *H01M 6/46* | (2006.01) |
| *B32B 37/22* | (2006.01) |
| *H05K 3/42* | (2006.01) |
| *B23K 26/38* | (2014.01) |
| *H01M 10/36* | (2010.01) |

(52) U.S. Cl.
CPC .............. *H01M 6/46* (2013.01); *B23K 26/381* (2013.01); *B32B 37/22* (2013.01); *B32B 38/04* (2013.01); *H01M 10/045* (2013.01); *H01M 10/36* (2013.01); *H05K 3/42* (2013.01); *B32B 2038/047* (2013.01); *B32B 2307/202* (2013.01); *B32B 2307/204* (2013.01); *B32B 2310/00* (2013.01); *B32B 2363/00* (2013.01); *B32B 2379/08* (2013.01)

(58) Field of Classification Search
CPC .... H01M 6/46; H01M 10/045; H01M 10/36; H01M 2/263; H01M 6/10; H01M 10/0431; H01M 10/0583; H01M 10/125; H01M 10/286; B32B 38/04; B32B 37/22; B32B 2038/047; B32B 2307/202; B32B 2307/204; B32B 2310/00; B32B 2379/08; B32B 2363/00; H05K 3/42; B23K 26/381
See application file for complete search history.

(56) References Cited

U.S. PATENT DOCUMENTS

| | | | | |
|---|---|---|---|---|
| 5,300,373 | A * | 4/1994 | Shackle | H01M 2/26 429/152 |
| 2002/0037756 | A1* | 3/2002 | Jacobs | A61N 1/3787 455/572 |
| 2006/0001137 | A1* | 1/2006 | Hundt | H01L 23/49575 257/678 |
| 2009/0208671 | A1* | 8/2009 | Nieh | C23C 14/025 427/596 |
| 2011/0271855 | A1* | 11/2011 | Eilertsen | H01G 11/86 101/141 |
| 2012/0244412 | A1* | 9/2012 | Pascaly | B01D 67/0032 429/144 |
| 2015/0072231 | A1* | 3/2015 | Kudoh | H01M 2/263 429/209 |

* cited by examiner

*Primary Examiner* — Carlos Barcena

(57) ABSTRACT

The technology relates to depositing free-standing electrical devices on a substrate and electrically connecting two or more of the free-standing electrical devices with the aid of a bendable scoring lines. These bendable scoring lines allow the thin-film substrate to be bended, or folded, to form a specific shape. Electrical devices include electrochromic devices or solid state batteries.

18 Claims, 7 Drawing Sheets

BENDABLE SCORING LINES IN THIN-FILM SOLID STATE BATTERIES

RELATED APPLICATIONS

This application claims the benefit of U.S. Provisional Application No. 61/859,633, filed Jul. 29, 2013, entitled "BENDABLE SCORING LINES IN SOLID STATE BATTERIES," and U.S. Provisional Application No. 61/974,932, filed Apr. 3, 2014, entitled "FABRICATION OF BENDABLE SCORING LINES IN SOLID STATE BATTERIES," which applications are incorporated herein by reference in its entirety.

INTRODUCTION

This application generally relates to thin-film electrical devices. Thin-film electrical devices include electrochromic devices and solid state batteries. Electrochromic devices are used in a variety of applications including privacy doors and windows. Solid state batteries are used in a variety of applications such as medical devices, vehicle technologies, and other electrical devices.

With respect to batteries, one metric for a battery is its capacity, which is expressed in a value of amp-hours. The capacity is related to the volume of the electrode materials. However, in the case of a thin-film battery, the cathode thickness is practically limited to less than 20-30 microns. As a result, the capacity of thin film batteries is often increased by increasing the area of the electrodes. As such, it is often desirous to manufacture large areas of thin-film batteries.

While large area thin-film devices may be useful, it is often impractical for a device to be manufactured with a large surface area. For instance, regions of the thin-film battery may be shorted by defects. For example, in the case of solid state batteries that employ very thin solid state electrolytes, connecting cells into batteries while avoiding shorts is difficult. Further, solid state batteries often locate both the positive and negative current collector on the same substrate, which may present challenges in avoiding electrical defects during manufacturing. Additionally, manually stacking disconnected thin-film electrical devices may be tedious or slow.

It is with respect to these and other considerations that embodiments have been made. Also, although relatively specific problems have been discussed, it should be understood that the embodiments should not be limited to solving the specific problems identified in the introduction.

The technology relates to depositing free-standing electrical devices onto a substrate and electrically connecting two or more of the free-standing electrical devices with the aid of a bendable scoring lines. These bendable scoring lines allow the thin-film substrate to be bended, or folded, to form a specific shape. Electrical devices include electrochromic devices or solid state batteries.

The technology includes a method of fabricated a thin-film electrical device. The method includes depositing a plurality of free-standing electrical devices on a substrate to form a pattern. The pattern includes a first partition and a second partition, the first partition including a first free-standing electrical device and the second partition including a second free-standing electrical device. The method includes forming at least a first perforation in the substrate, wherein the perforation separates the two partitions. The method also includes folding the substrate along the perforation. The method further includes electrically connecting the first free-standing electrical device to the second free-standing electrical device to form a first electrical device stack.

An embodiment of a thin-film battery stack is disclosed. The thin-film battery stack includes a substrate. The thin-film battery stack also includes a first solid state battery deposited onto the substrate. The first solid state battery has a first cathode current collector, a first cathode, a first electrolyte, a first anode, and a first anode current collector.

The thin-film battery stack also includes a second solid state battery deposited onto the substrate. The second solid state battery includes a second cathode current collector, a second cathode, a second electrolyte, a second anode, and a second anode current collector. The first solid state battery and the second solid state battery separated by a folded perforation on the substrate;

The first solid state battery is positioned over the second solid state battery. A stack anode current collector and a stack cathode current collector is disclosed. In embodiments, the stack anode current collector electrically connects the first anode current collector with the second anode current collector. Further the stack cathode current collector electrically connects the first cathode current collector with the second cathode current collector.

Additionally, a method of forming a thin-film electrical stack is disclosed. The method includes depositing a plurality of free-standing electrical devices onto two sides of a thin-film substrate. The method further includes testing at least some of the plurality of the free-standing electrical devices. The method further includes determining that at least one of the plurality of the free-standing electrical devices is not functioning based on the testing. Additionally, the method includes removing the at least one of the plurality that is not functioning. Further, the method includes etching the substrate to form perforated lines that separate a first free-standing electrical device from a second free standing electrical device. Additionally, the method includes cutting the substrate along a path different from the perforation. Further, the method includes folding the substrate to form a dielectric stack.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

BRIEF DESCRIPTION OF THE DRAWINGS

Non-limiting and non-exclusive embodiments are described with reference to the following figures.

DETAILED DESCRIPTION

Various embodiments of free-standing electrical devices with bendable scoring lines are described more fully below with reference to the accompanying drawings and attachments, which form a part hereof, and which illustrate example embodiments. However, embodiments may be implemented in many different forms and should not be construed as limited to the embodiments set forth herein. Rather, these embodiments are provided so that this disclosure will be thorough and complete and will fully convey the scope of the embodiments to those skilled in the art. Embodiments may be practiced as methods, systems, or devices. The following detailed description is, therefore, not to be taken in a limiting sense.

Figure 1:
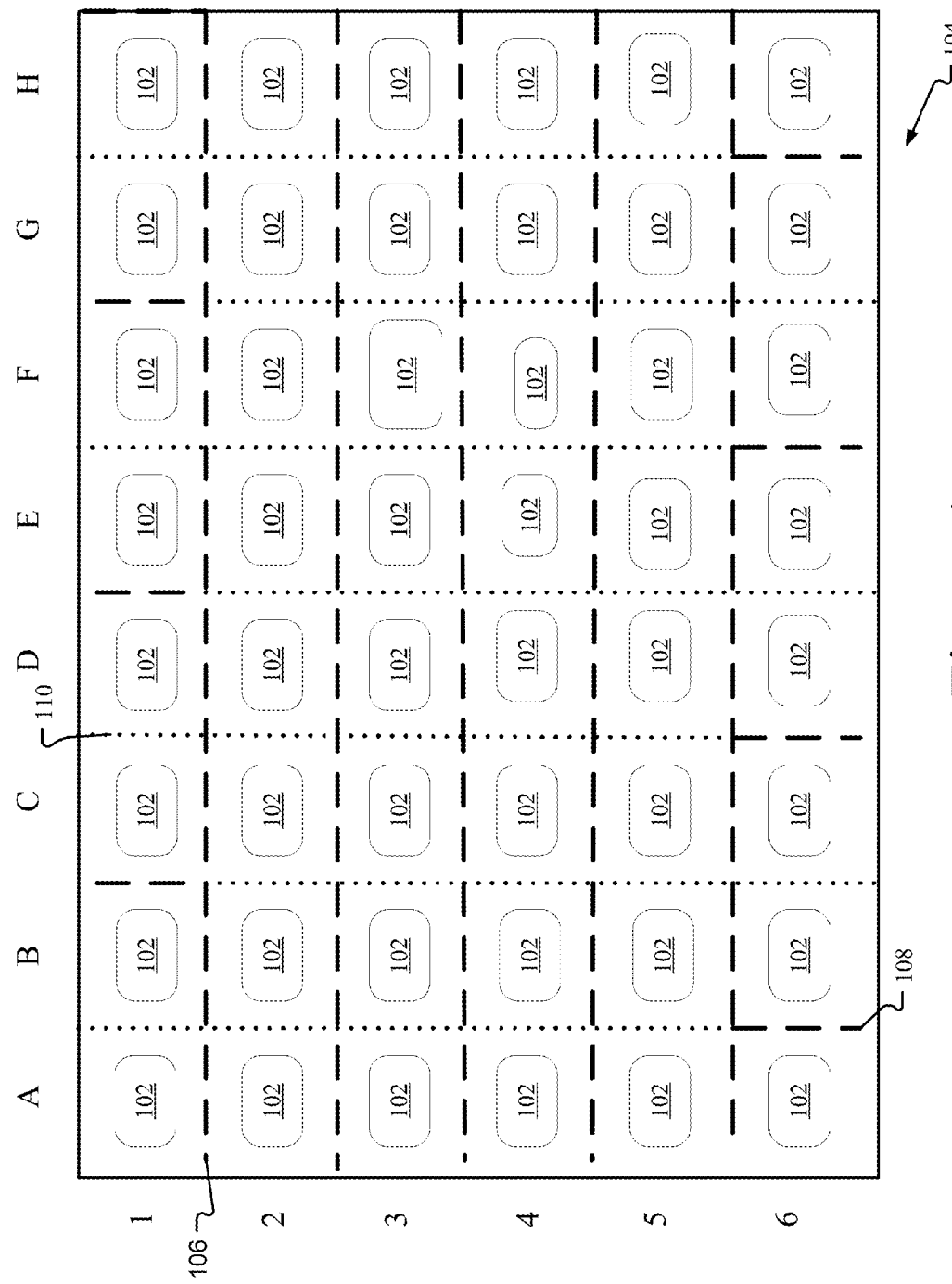
FIG. 1 illustrates an embodiment of a plurality of free-standing electrical devices deposited on a substrate.

FIG. 1 illustrates an embodiment of a plurality of free-standing electrical devices deposited on a substrate. Column and row labels are also illustrated. Specific partition sections will be referred to using column headers A-H and row headers 1-6. For example the upper left partition is partition A1.

Free-standing electrical devices 102 are deposited onto a substrate 104. Deposition may occur using various techniques now known or later developed including pulsed laser deposition, magnetron sputtering, chemical vapor deposition, or sol-gel processing. Free-standing electrical devices may vary in size. In one embodiment, the free-standing electrical devices are 1 cm$^2$. The technology disclosed allows for a 10 cm×10 cm substrate to include 80 free standing electrical devices.

Each of the free-standing electrical devices 102 that are deposited onto the substrate 104 need not be the same size, shape, or architecture as other free-standing electrical devices. For example, the free-standing electrical devices located in partition A1 may not be of the same architecture as free-standing electrical device located in A2. Such decisions may be made in anticipation of folding the partitions in a particular order and/or dividing the thin film. An example architecture is described more with reference to FIG. 3.

As used, the term free-standing electrical device means that the device is capable of being used alone for its intended purpose. For example, a free-standing electrical device that is a battery may include an anode, a cathode, an electrolyte, a cathode current collector, and an anode current collector.

Substrate 104 is a thin substrate. In an embodiment, the substrate is less than 100 microns. The substrate 104 may be may be flexible or rigid. For example, the substrate may be one of polyimide, polyethylene terephthalate (PET), metal foil, dielectric coated metal foils, thin flexible glass, and/or thin flexible ceramic. Any other suitable substrate may be used. Substrate 104 is a thin substrate. In an embodiment, the substrate is than 100 microns. The substrate 104 may be may be flexible or rigid. For example, the substrate may be one of polyimide, polyethylene terephthalate (PET), metal foil, dielectric coated metal foils, thin flexible glass, and/or thin flexible ceramic. Any other suitable substrate may be used.

Testing on the free-standing electrical devices 102 may be performed after deposition. Testing is used to discover damaged free-standing electrical devices. In some cases, the damaged free-standing electrical devices will be obvious with visual inspection. Additionally, testing may involve measurement of the open circuit potential of the free-standing electrical device. In an embodiment where the device is a battery, only free-standing electrical devices within an acceptable voltage range may be considered for integration into a battery. For instance, for a thin-film battery with a lithium cobalt dioxide cathode and lithium metal anode, an open circuit potential greater than 1.5V may be desirable. A free-standing electrical device may also be cycled to measure capacity, resistance, etc. to screen those free-standing electrical devices s that are adequate for integration into a battery. Damaged free-standing electrical device may be removed from the sheet prior to integration into a battery. The removal can be done by means of laser scribing, mechanical punching, or any other suitable means.

FIG. 1 also illustrates horizontal scoring lines 106 and vertical scoring lines 108. Scoring lines partition the thin film into partitions. The scoring lines may be manufactured into the substrate 104 using one or more of a variety of processes including etching (i.e. chemical), drilling (i.e. mechanical), and scribing (i.e. laser). Though the scoring lines are illustrated as straight lines to form rectangular partitions, other partition shapes may be created. For example, any polygon shape may be used. FIG. 1 additionally illustrates one free-standing electrical device in each partition. In other embodiments, there are multiple free-standing electrical devices in a single partition. The multiple free standing devices in a single partition may or may not be electrically connected.

In an embodiment, horizontal scoring lines 106 and vertical scoring lines 108 form a perforated pattern. The size and spacing of the perforations may be optimized to balance mechanical integrity of perforation lines with ease of bending for subsequent packaging steps. For certain substrates, durability of the bend may be increased by maximizing the distance between perforations. In an embodiment, a polyimide substrate is perforated in a pattern with a ratio of the perforation to spacing of about 1:1.

Substrate detachment lines 110 (the dotted line) illustrate a detachment pattern. Substrate detachment lines 110 are areas where the substrate has been removed or detached. As illustrated, partition A1 is not directly attached to partition B1 because the substrate has been removed or cut along the detachment line. Removal or cutting may occur through a variety of means. For example, the substrate may be cut using a blade. Alternatively, the substrate may be removed using etching (i.e. chemical), drilling (i.e. mechanical), and scribing (i.e. laser). In an embodiment, a laser is used at a speed of 100/mms second, with a diode current of 30 A, and a pulse frequency of 15 kHz.

The substrate 104 may be folded to form a thin-film device stack. The pattern in which the substrate 104 is folded is guided by detachment lines 110, vertical scoring lines 108, and horizontal scoring lines 106. For example, the horizontal scoring line 106 between partition A1 and partition A2, combined with the detachment line 108 between A1 and B1, allows for A1 to fold over A2. A1 may also be folded under A2. Such folding ability is denoted as a folding pattern A1-A2. Thus, the illustrated the detachment lines 110, the vertical scoring lines 108, and the horizontal scoring lines 106 guide a folding pattern of A1-A2-A3-A4-A5-A6-B6-B5-B4-B3-B2-B1-C1-C2-C3-C4-C5-C6-D6-D5-D4-D3-D2-D1-E1-E2-E3-E4-E5-E6-F6-F5-F4-F3-F2-F1-G1-G2-G3-G4-G5-G6-H6-H5-H4-H3-H2-H1. Other patterns of detachment lines and scoring lines allow for other folding patterns. Indeed, the detachment lines and scoring lines need not form a grid pattern, but may form any pattern.

Figure 2:
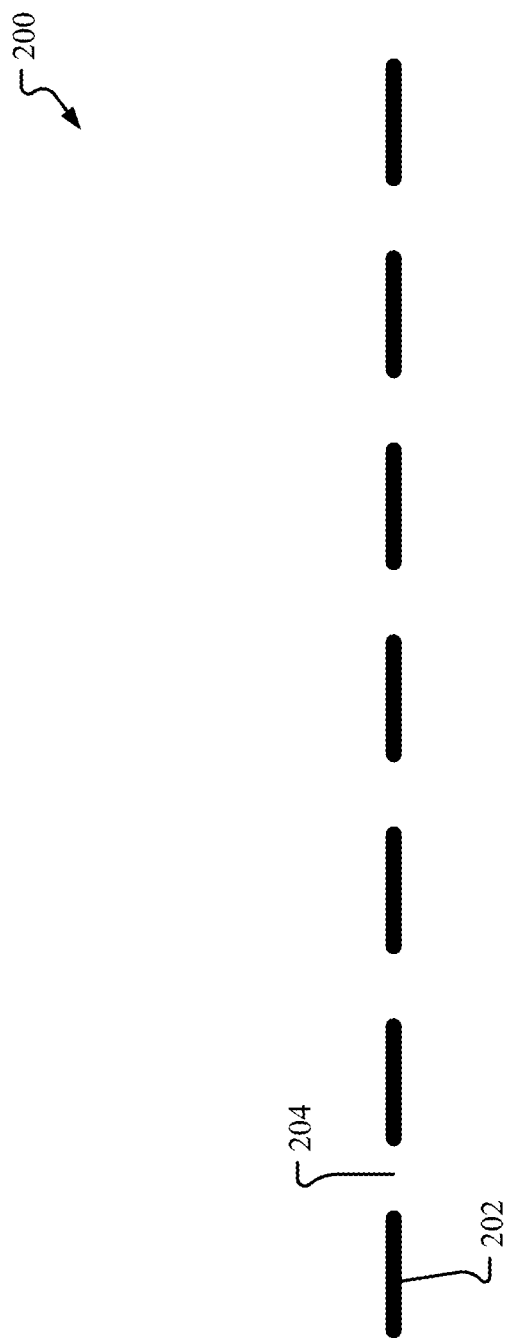
FIG. 2 illustrates an embodiment of a scoring line.

FIG. 2 illustrates an embodiment of a scoring line 200. A scoring line includes an etch 202, which is the portion of the substrate which has been removed, and the remainder 204, which is the portion of a substrate that has been left. By removing a portion of the substrate, the substrate is more easily bent. Leaving the remainder decreases the likelihood that a partition will detach from the rest of the film. The etch 202 may be filled with a bendable adhesive substance to maintain bendability while decreasing the likelihood of detachment. All of the substrate need not be removed from the etch 202.

In an embodiment, a two-step process is used. The remainder 204 is first removed. The remainder 204 is then filled with a bendable adhesive material. After this step, the etch 202 is created. In such an embodiment, the remainder 204 the flexible adhesive, while the etch 202 is a void.

Figure 3:
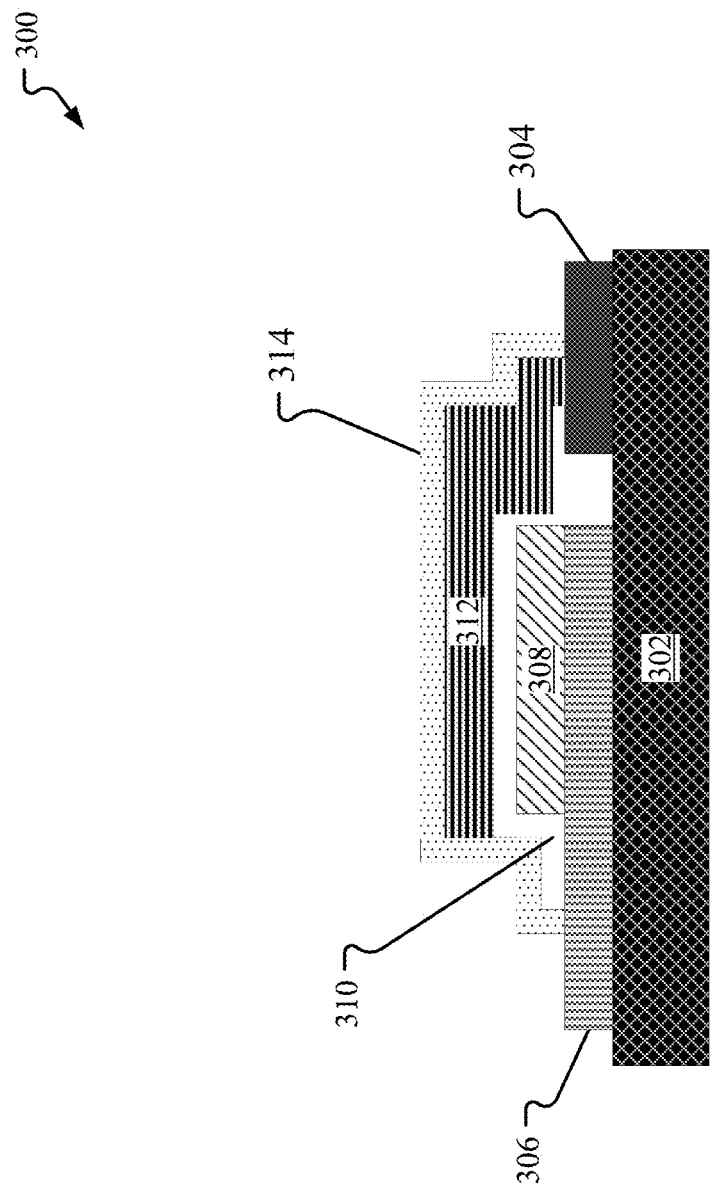
FIG. 3 illustrates an example free-standing electrical device architecture.

FIG. 3 illustrates an example free-standing electrical device architecture 300. In an embodiment, the free-standing electrical device includes a substrate 302, to which layers have been deposited. These layers include a cathode current collector 306, a cathode 308, an electrolyte layer 310, an anode 312, and an anode currently collector 304. A barrier 314 is also shown.

In an embodiment, the substrate 302 layer is polyethylene terephthalate ("PET"). In other embodiments, the substrate is one of plastic, stainless foil, glass, and ceramic. Any other suitable material, now known or later developed may also be used for the substrate 302.

The cathode current collector layer 306 may be a variety of conductive materials such as metal (e.g., gold) or a conductive paste or ink. For example, the cathode current collector may be a thin metal cathode current collector 306, and may have a thickness on the order of 100-500 nm.

In the embodiment illustrated, the cathode 308 is in direct contact with the cathode current collector 306. The cathode current collector 306 serves as a contact for the cathode 308. Additionally, the cathode 308 may be a variety of material. For example, the cathode 308 is a metal oxide in an embodiment. Specifically, the cathode 308 may be one of LiCoO2, LiMn2O4, or LiFePO4. In an embodiment, a thin cathode 308 is made of lithium cobalt dioxide and has a thickness from 1-20 microns.

An electrolyte 310 is shown. The electrolyte 310 separates the cathode 308 from the anode 312. Lithium phosphorus oxynitride (LiPON) is an amorphous polymer material that may be used as an electrolyte 310, though any currently known or future material suitable for use as an electrolyte in a thin-film solid state battery may be used. In an embodiment, the electrolyte 310 is lithium phosphorus oxynitride with a thickness of less than 3 microns.

In the embodiment illustrated, an anode 312 is deposited on the electrolyte 310. In an embodiment, the anode 312 may be lithium or a material containing lithium. In various embodiments, the anode 312 acts as the anode current collector 304. In an embodiment, anode 312 is a thin lithium metal anode with thickness less than 5 microns.

An anode current collector 304 is illustrated. The anode current collector 304 may be nickel or another conductive material such as a metal or a conductive paste or ink. In an embodiment, an anode current collector 304 is a thin metal anode current collector 304 with thickness on the order of 100-500 nm.

A barrier 314 may be added to the free-standing electrical device. The barrier 314 may be an environmental barrier coating layer and/or and electrical isolation layer. All layers are deposited on a single substrate and patterned to enable contact to the cathode current collector and anode current collector layers. The order of the layers is not limited to those shown in the image.

Figure 4:
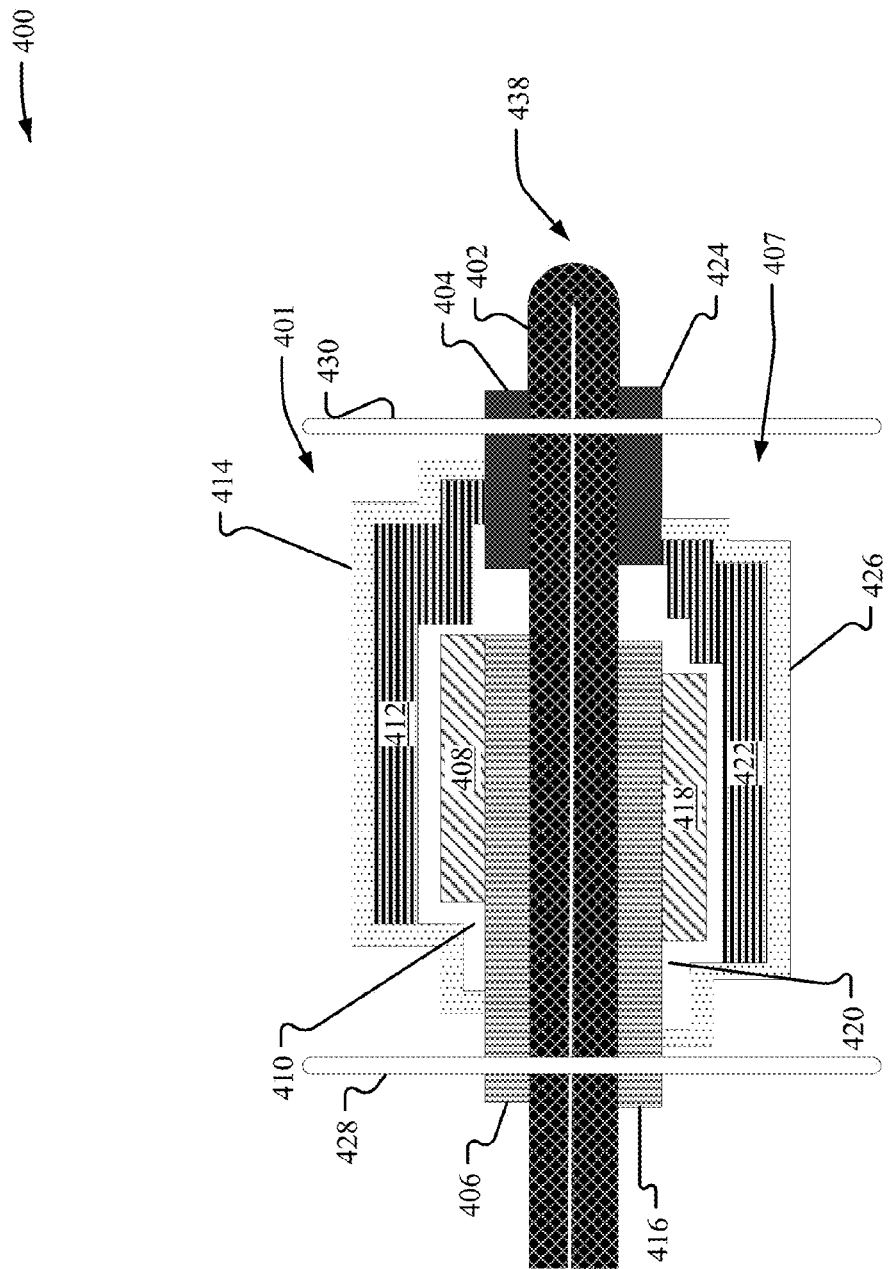
FIG. 4 illustrates an embodiment of a cross section of two free-standing electrical devices in a stacked configuration.

FIG. 4 illustrates an embodiment of a cross section of two free-standing electrical devices in a stacked configuration. FIG. 4 illustrates a first free-standing electrical device 401 stacked above a second free-standing electrical device 407. As illustrated, the free-standing electrical device is similar to the device described with reference to FIG. 3. For example, the first free-standing electrical device 401 has a cathode current collector 406, a cathode 408, an electrolyte 410, an anode 412, an anode current collector 404 and a barrier 414. Additionally, the second free-standing electrical device 407 has a cathode current collector 416, a cathode 418, an electrolyte 420, an anode 422, an anode current collector 424 and a barrier 426. Other architectures, however, are contemplated.

Both free-standing electrical devices are deposited onto a folded substrate 402. In an embodiment, folded substrate 402 has a perforated fold 438. Substrate 402 may be a layer ispolyethylene terephthalate ("PET"). In other embodiments, the folded substrate 402 is one of plastic, stainless foil, glass, and ceramic. Any other suitable material, now known or later developed may also be used for the folded substrate 402. The architectures do no need to be the same on both sides of the fold. Indeed the anode current collector of a first free standing electrical device may be positioned above the cathode of a second free standing electrical device. This may occur by varying the architectures and/or staggering the devices.

As illustrated, a stack cathode current connector 428 electrically connects the cathode current collector 406 of the first free-standing electrical device 401 with the cathode current collector 416 of the second free-standing electrical device 407. Further a stack anode current connector 430 electrically connects the anode current collector 404 of the first free-standing electrical device 407 with the anode current collector 424 of the second free-standing electrical device 407.

Figure 5:
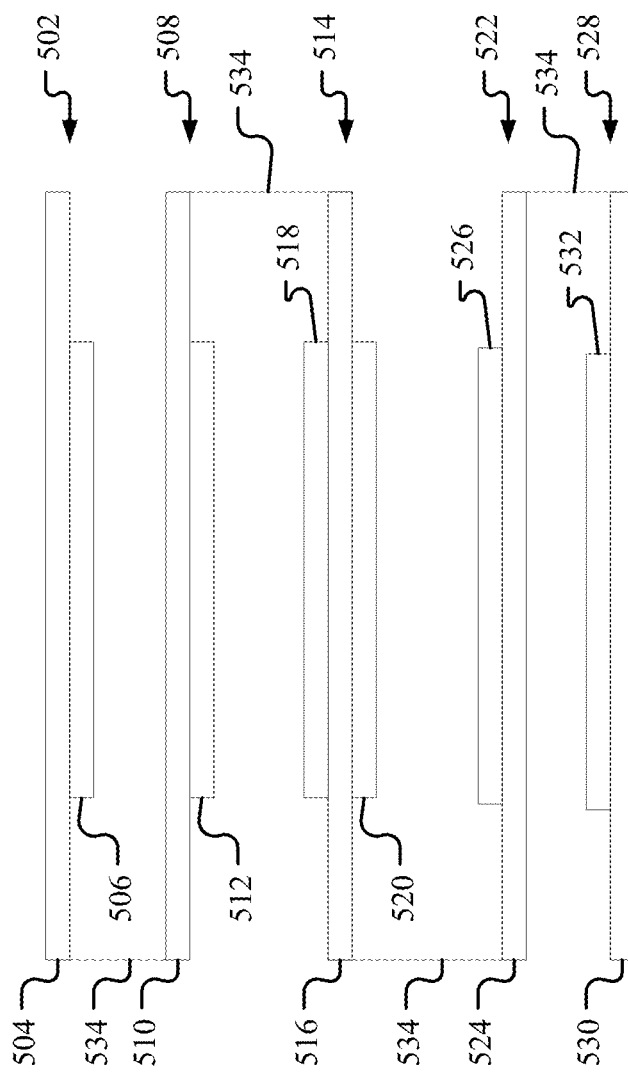
FIG. 5 illustrates various orientations of multiple free-standing electrical devices.

FIG. 5 illustrates an embodiment of an exploded view of multiple layers of an electrical device. As illustrated, a first layer 502 includes a first substrate layer 504 and a first free-standing electrical device 506, a second layer 508 includes a second substrate 510 and a second free-standing electrical device 512, a third layer 514 includes a third substrate 516, a third top free-standing electrical device 518 and a third bottom free-standing electrical device 520, a fourth layer 522 includes a dual-sided fourth substrate 524 and a fourth free-standing electrical device 526, and a fifth layer 528 includes a fifth substrate 530 and a fifth free-standing electrical device 532. As illustrated, each layer is attached to at least one other layer via a bendable scoring line 534. The first layer 502 is above the second layer 508, the second layer 508 is above third layer 514, the third layer 514 is above fourth layer 522, and the fourth layer is above fifth layer 528.

As illustrated, the third bottom free-standing electrical device 520 is substantially aligned with the third top free standing electrical device 518. In other embodiments, the bottom free-standing electrical device is offset from the top free-standing electrical device.

Figure 6:
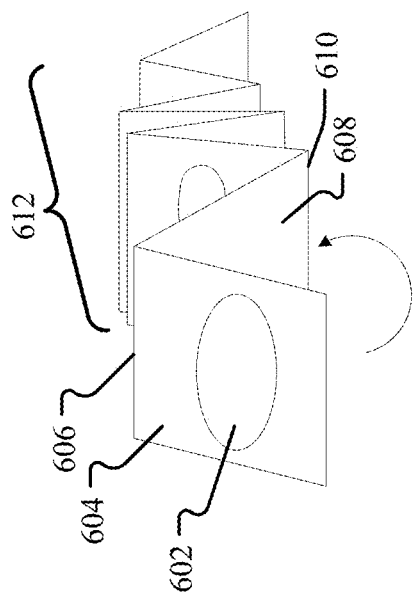
FIG. 6 illustrates multiple free-standing electrical devices in an accordion bend.

FIG. 6 illustrates multiple free-standing electrical devices in an accordion bend. FIG. 6 includes a first substrate 604 in which a first free-standing electrical devices 602 is deposited. A first fold 606 may be perforated, and the first fold 606 connects the first substrate 604 to the second substrate 608. The second substrate 608 may have a free-standing electrical devices deposited onto it. As indicated by the arrow in FIG. 6, folding occurs along the fold 606 to dispose the first substrate 604 on top of second substrate 608. Further, as illustrated the second substrate 608 may have a second fold 610, which is attached to a plurality of substrates 612. This plurality, along with substrate 604 and substrate 608, may be collapsed to form a stack.

Figure 7:
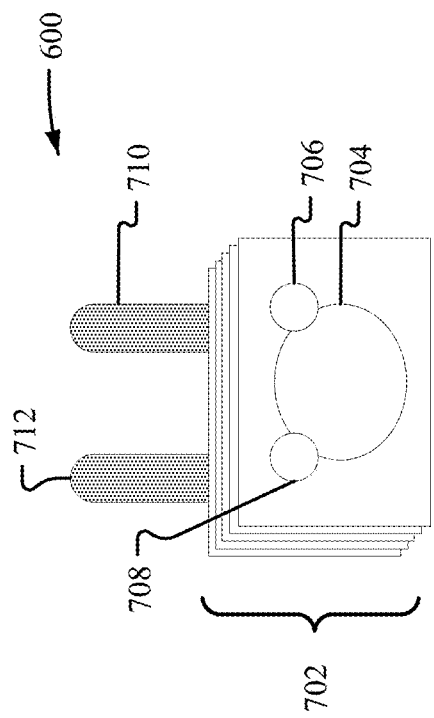
FIG. 7 illustrates multiple free-standing electrical devices in an electrically coupled stacked configuration.

FIG. 7 illustrates an electrically coupled stacked configuration 700. The stacked configuration includes a plurality of thin-film devices 702, with at least one of the plurality having at least one free-standing electrical devices 704. Each of the electrical devices in the stack is electrically coupled via an anode current collector 706 and a cathode current collector 708. As illustrated, electrical terminals 710 and 712 are connected to the stack anode current collector 706 and the stack cathode current collector 708, respectfully. Further, as illustrated, the stack anode collector 708 and the stack cathode collector 706 are electrically coupled to the free-standing electrical device 704.

Additionally, and adhesive may be used to couple each of the plurality in the plurality of thin-film devises to one another. Other means may be used as well. For example, mechanical clamps or screws may be used. Any suitable method may be used.

The stack anode current collector 706 and the stack cathode current collector 708 may be manufactured by first creating holes through the plurality of thin-film electrical devices 702. Such holes may be created through each layer where the anode current collector 706 and the cathode current collector 708 are to be located. Conductive epoxy may be then injected into each of the holes to electrically connect each of the plurality of thin-film devices. Afterwards, electrical terminals 710 and 712 may be connected to the anode current collector 706 and the cathode current collector 708, respectfully. Connection may occur using a similar or same conductive epoxy. Insulating coatings may then be deposited over the electrically coupled stacked configuration 700 to prevent shorting of the free-standing electrical devices, as well as to provide a barrier against environmental reactions. Any suitable method may be used.

Figure 8:
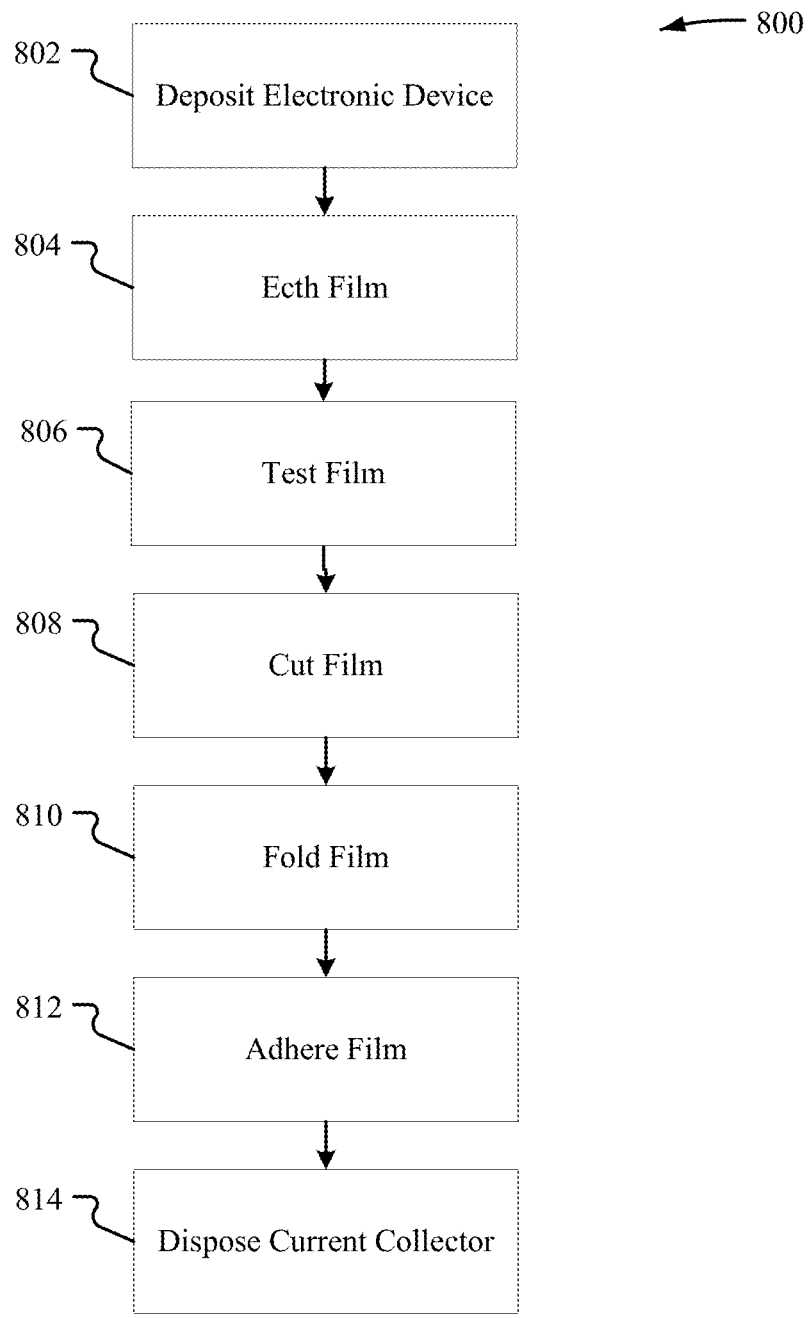
FIG. 8 is a method of creating a thin-film device stack.

FIG. 8 is a method of creating a thin-film device stack. Method 800 begins with deposit electrical device operation 802. Depositing an electrical device occurs by depositing multiple layers of a device upon a substrate. Deposition may occur in a variety of ways. Multiple electrical devices may be deposited an area of the thin film. For example, multiple electrical devices may be deposited on a substrate to form a grid pattern, a spiral pattern, or another pattern. Pattern selection may be done in anticipation of folding the electrical devices to form a thin film stack.

Method 700 proceeds to etch film operation 804. In etch operation 804 one or more perforations are etched into the substrate. Etching may occur in the substrate area where a thin-film electrical device has not been deposited. In an embodiment, the etch is through the entire thickness of the substrate. In another embodiment, only the top portion of the substrate is removed. Still in other embodiments, the pattern is not a perforation, but is a straight line where the top portion of the substrate has been removed. In an embodiment, etching allows for ease of bendability of the substrate.

The method 700 then proceeds to test and remove operation 806. In test and remove operation 706, the film is tested for defects. Testing on the free-standing electrical devices may be performed after deposition. In some cases, the damaged free-standing electrical devices will be obvious with visual inspection. Additionally, testing may involve measurement of the open circuit potential of the free-standing electrical device. In an embodiment where the device is a battery, only free-standing electrical device within an acceptable voltage range may be considered for integration into a battery. For instance, for a thin-film battery with a lithium cobalt dioxide cathode and lithium metal anode, an open circuit potential greater than 1.5V may be desirable. A free-standing electrical device may also be cycled to measure capacity, resistance, etc. to screen those free-standing electrical devices that are adequate for integration into a battery. Damaged free-standing electrical device may be removed from the sheet prior to integration into a battery. The damaged free-standing electrical device may be removed in such a way that leaves the partition of the damaged free-standing electrical device in place. The removal can be done by means of laser scribing, mechanical punching, or any other suitable means.

Removal of these damaged free-standing electrical devices may occur via punch-out or other means. Removing of the free-standing electrical devices need no remove the entire partition.

The method 800 then proceeds to cut film operation 808. In an embodiment, in operation 808 the film is cut using mechanical means such as cutting shears or another mechanical means such as a drill. In another embodiment, the film may be cut using a chemical or laser. Determining where to cut is determined based upon a folding sequence. For example, the film may be cut into an S or zig-zag pattern to fold in an accordion-like shape.

The method 800 then proceeds to fold film operation 810. In fold film operation 810 the film is folded. In an embodiment, the film is folded along the etched scoring lines. Folding may occur through a variety of means. For example, machine and hand folding is contemplated. Folding forms a thin-film electrical device stack.

The method 800 then proceeds to adhere film operation 812. In adhere film operation 812, the folded stacks are adhered together. For example, a glue or other form of adhesive may be placed on edges of the stack to bind the stack. One the adhesive is placed on the thin-film electrical device, the device may require time for the adhesive to set.

The method 800 then proceeds to dispose current collector operation 814. In dispose current collector operation 814, holes are formed through one or more layers of the thin-film stack. This may be done by laser, drill, or chemical means. A conductive epoxy or other conductive material, such as a metal, may then be placed into the hole. Electrical terminals may be connected to current collectors formed in dispose current collector operation 814.

What is claimed is:

1. A method of fabricated a thin-film electrical device, the method comprising:
   depositing a plurality of free-standing electrical devices on a substrate to form a pattern, the pattern including a first partition and a second partition, the first partition including a first free-standing electrical device having a first set of current collectors and the second partition including a second free-standing electrical device having a second set of current collectors, wherein, after the depositing, the first free-standing electrical device and the second free standing electrical device are not electrically connected, and further wherein the pattern is patterned in such a way that, after a folding, the first set of current collectors is aligned with the second set of current collectors for a boring;
   forming at least a first perforation in the substrate, wherein the perforation separates the two partitions;

performing the folding, which comprises folding the substrate along the perforation to form a stack; and electrically connecting the first free-standing electrical device to the second free-standing electrical device by:

performing the boring, which comprises boring at least two holes into the stack; and filling the at least two holes with an electrically conductive material such that the first set of current collectors is electrically connected to the second set of current collectors to form a first electrical device stack.

2. The method of claim 1, wherein each of the plurality of free-standing electrical devices is a thin-film battery.

3. The method of claim 1, wherein the electrically connecting step includes electrically connecting a first anode current collector of the first free-standing electrical device to a second cathode current collector of the second free-standing electrical device.

4. The method of claim 1, wherein boring the at least two-holes is performed using a laser.

5. The method of claim 1 wherein the first free-standing electrical device and the second free-standing electrical device are connected in series.

6. The method of claim 1, wherein the first free-standing electrical device and the second free-standing electrical device have the same electrical architecture.

7. The method of claim 1, wherein the electrically conductive material is a conductive epoxy.

8. The method of claim 1, wherein the substrate is polyimide.

9. The method of claim 1, further comprising:

filling the at least first perforation with a flexible material.

10. The method of claim 1, wherein a laser is used to form the first perforation.

11. The method of claim 1, further comprising:

testing at least some of the plurality of the free-standing electrical devices;

determining that at least one of the plurality of the free-standing electrical devices is not functioning based on the testing; and removing the at least one of the plurality of the free-standing electrical devices that is not functioning before folding along the perforation.

12. A method of fabricated a thin-film electrical device, the method comprising:

depositing a plurality of free-standing electrical devices on a substrate to form a pattern, the pattern including a first partition and a second partition, the first partition including a first free-standing electrical device and the second partition including a second free-standing electrical device;

forming at least a first perforation in the substrate, wherein the perforation separates the two partitions;

folding the substrate along the perforation and electrically connecting the first free-standing electrical device to the second free-standing electrical device to form a first electrical device stack; and filling the at least first perforation with a flexible material.

13. The method of claim 12, wherein each of the plurality of free-standing electrical devices is a thin-film battery.

14. The method of claim 12, wherein the electrically connecting step includes electrically connecting a first anode current collector of the first free-standing electrical device to a second cathode current collector of the second free-standing electrical device.

15. The method of claim 12, wherein electrically connecting includes boring a hole through the electrical device stack and filling the holes with a conductive material.

16. The method of claim 12 wherein the first free-standing electrical device and the second free-standing electrical device are connected in series.

17. The method of claim 12, wherein the first free-standing electrical device and the second free-standing electrical device have the same electrical architecture.

18. The method of claim 1, wherein a laser is used to form the first perforation.

\* \* \* \* \*